United States Patent
Mansouri et al.

(10) Patent No.: US 6,577,640 B2
(45) Date of Patent: Jun. 10, 2003

(54) FORMAT PROGRAMMABLE HARDWARE PACKETIZER

(75) Inventors: Mack Mansouri, Wheeling, IL (US); Daniel Stewart, Hoffman Estates, IL (US); Steven Rossi, Elk Grove Village, IL (US)

(73) Assignee: Motorola, Inc., Schaumburg, IL (US)

( * ) Notice: Subject to any disclaimer, the term of this patent is extended or adjusted under 35 U.S.C. 154(b) by 175 days.

(21) Appl. No.: 09/920,974

(22) Filed: Aug. 1, 2001

(65) Prior Publication Data

US 2003/0026280 A1 Feb. 6, 2003

(51) Int. Cl.[7] .......................... H04L 12/54; H04L 24/06
(52) U.S. Cl. ...................... 370/429; 370/381; 375/340; 375/342
(58) Field of Search ................................. 370/381, 382, 370/428, 429, 358, 360, 378, 379, 389, 394, 400, 412, 420, 458, 468, 473, 475, 535; 386/111, 112, 27, 33, 69, 37, 110; 375/340, 342

(56) References Cited

U.S. PATENT DOCUMENTS

| | | | | |
|---|---|---|---|---|
| 5,805,762 A | * | 9/1998 | Boyce et al. | .................. 386/68 |
| 6,085,252 A | * | 7/2000 | Zhu et al. | .................... 709/231 |
| 6,292,490 B1 | * | 9/2001 | Gratacap et al. | ............ 370/412 |

* cited by examiner

Primary Examiner—William A. Luther
(74) Attorney, Agent, or Firm—Kenneth A. Haas (57) ABSTRACT

A format programmable hardware packetizer (110) receives real-time raw input data (125) from a multimedia data source (103) via an analog to digital converter (105) and a data encoder (120) gated by encoder interrupts (127). The real-time raw input data is buffered in an internal byte collector of the packetizer (110). A main CPU interrupt (117) is issued to the main processor (130) when a packet boundary code is received. The packetizer (110) formats the data according to a desired format selected on line (115) for dump to the main memory (140) while providing a managed, much lower level of interrupts to the main processor (130) on the CPU interrupt line (117). A plurality of hardware packetizers (110) can be deployed according to alternative constructions for efficient real time packetizing in various selected formats.

26 Claims, 7 Drawing Sheets

FORMAT PROGRAMMABLE HARDWARE PACKETIZER

BACKGROUND OF THE INVENTION

1. Technical Field

The present invention relates to the processing of multimedia data and, more particularly, relates to a hardware packetizer with programmable formats.

2. Brief Description of the Related Art

Multimedia sources, such as digital video cameras, generate large streams of digital data. Numerous digital video formats are available today, such as, MPEG4, ITU H.263, ITU G.711 and AMR. Furthermore, many of these video formats can be packetized in multiple ways. For example, the H.263 format can be packetized according to IETF RFC 2429 or RFC 2019. RFC 2429 requires a two byte header preceding the video data whereas RFC 2019 requires a four byte or eight byte header preceding the video data. In both cases the video data content is the same but the formatting is different. Furthermore, QuickTime uses the RFC 2429 format standard for H.263 transmission/reception and NetMeeting uses the RFC 2019 format standard for transmission/reception. Accordingly, a packetizer is needed for flexibly arranging such multimedia data in a desired format.

A microprocessor is capable of arranging such multimedia data in a format. A source such as a digital camera supplies multimedia data to an encoder. The encoder provides encoded multimedia data and interrupts in fits and bursts to the microprocessor. These fits and bursts cause the microprocessor to experience frequent and unpredictable interrupt loads. Many microprocessors available today are incapable of handling such a load even if dedicated to the task when a large variety of formats are to be managed, and very few, if any, microprocessors can simultaneously handle a plurality of multimedia sources in real time. Nevertheless, most systems containing microprocessors use them to provide many functions for the system; accordingly, multimedia demands will overload a main processor. Most systems, such as a personal computer or portable electronic device such as a cellular telephone, video server or third generation 3G cellular basestation, use a dedicated main microprocessor. Such a main microprocessor is incapable of handling the load required by real time multimedia processing.

DETAILED DESCRIPTION OF THE PREFERRED EMBODIMENTS

Figure 1:
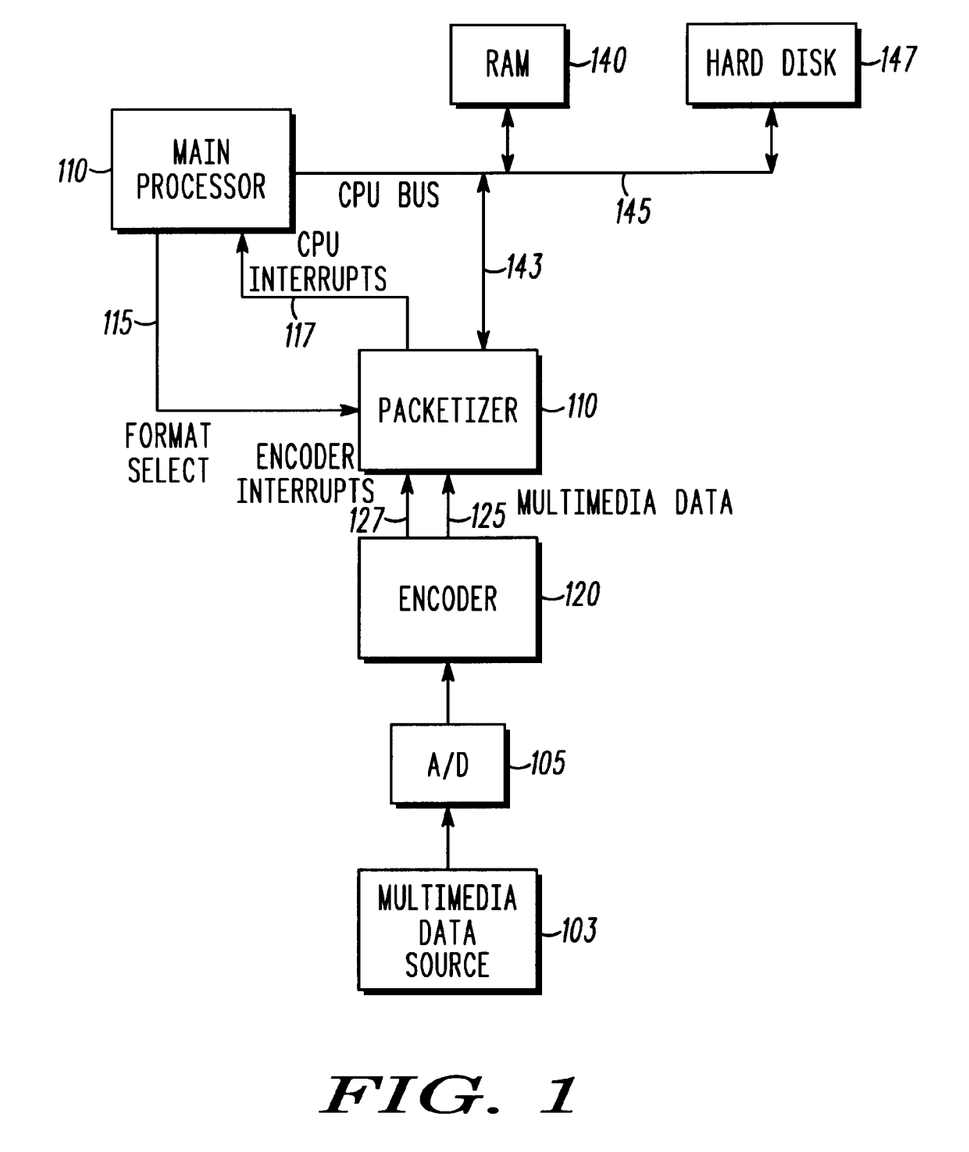
FIG. 1 illustrates a system for encoding and packetized in multimedia data according to a required format using the hardware packetizer of the present invention.

The present invention solves these and other problems by providing a format programmable hardware packetizer 110 as illustrated in the system of FIG. 1 for encoding and packetizing real-time raw multimedia input data. This format programmable hardware packetizer 110 receives in real-time the multimedia data stream 125 output from an encoder 120. An analog to digital converter 105 provides the multimedia data stream from a multimedia data source 103 such as a digital video camera to the encoder 120. The hardware packetizer 110 packetizes the multimedia data stream 125 according to a format selected at line 115 by a main processor 130. The packetizer 110 stores the multimedia data stream in an internal buffer according to be selected format until a write operation is needed to main memory 140. Write operations are made to main memory 140, over a bus arbitrator line 143, until a complete packet is contained in main memory. The memory 140 is preferably a random access memory (RAM) coupled to the main processor 130 by a CPU bus 145. A hard disk 147 or other type of memory can also be connected to the CPU bus 145. Once a complete packet is finished and written to main memory, an interrupt is provided to the main processor 130 on a CPU interrupt line 117. The packetizer 110 receives numerous fits and bursts of encoder interrupts 127 from the encoder 120 and formats the data according to a desired format selected on line 115 for dump to the main memory 140 while providing a managed, much lower level of interrupts to the main processor 130 on the CPU interrupt line 117. Multimedia data preferably includes one or more of digital video, audio, vector graphics or text.

Figure 2:
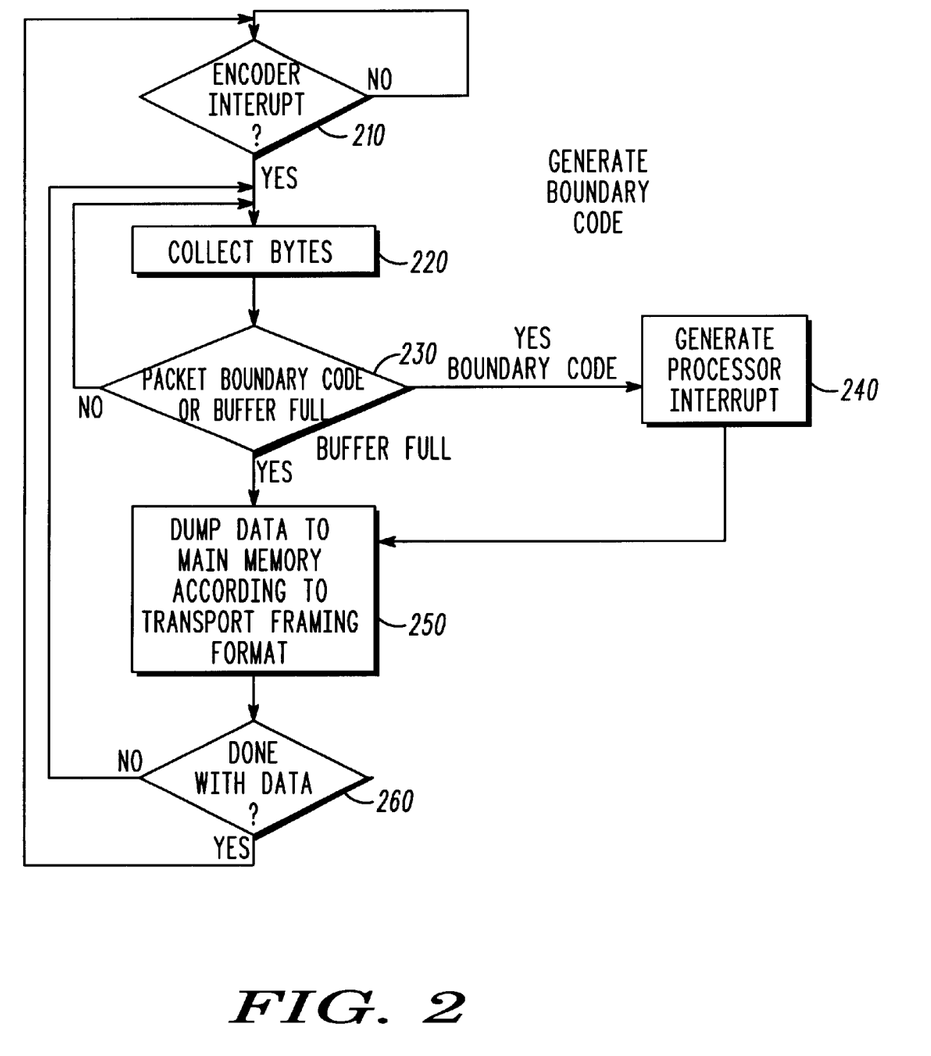
FIG. 2 illustrates a flow chart of the operation of the format programmable hardware packetizer.

FIG. 2 illustrates a flow chart of the operation of the format programmable hardware packetizer 110. At step 210 the hardware packetizer 110 waits for an encoder interrupt 127 from the encoder 120. When an encoder interrupt is received, bytes are collected at step 220 in the internal buffer of the packetizer 110. While bytes are collected in the internal buffer of the packetizer 110, step 230 looks for a packet boundary code or a buffer full indication. When the internal buffer of the packetizer 110 becomes full, the internal buffer is dumped at step 250 to the main memory according to the transport framing format of the desired selected format. The framing format has been pre-written by the CPU to a register inside the packetizer. Once the transfer from the internal buffer to main memory is complete, a decision is made at step 260 whether the encoder has further byte transfers to make. If the encoder has further byte transfers to make, the packetizer returns to step 220, collecting more bytes from the encoder until the encoder has no further bytes to transfer. When the encoder has no further bytes to transfer, step 260 returns the packetizer to step 210, waiting for another interrupt from the encoder. When, in the course of the byte transfers from the encoder to the packetizer's internal buffer, a packet boundary code is detected, step 240 generates a CPU interrupt 117 to indicate that a new packet has begun and proceeds to step 250 to dump the buffer data to the main memory 140. Due to the packetizer dumping data directly into main memory without CPU intervention, the CPU does not need to be aware of the buffer full transactions which the packetizer makes because the CPU does not access the data until the complete packet is available in main memory.

Figure 3:
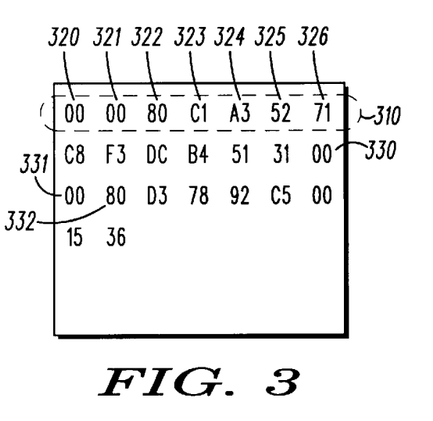
FIG. 3 illustrates the multimedia data streams from an encoder.

FIG. 3 illustrates the multimedia data stream 125 in hexadecimal numbers from the encoder 120. In the example of FIG. 3, the multimedia data stream 125 arrives in words of seven hexadecimal numbers 320–326.

Figure 4:
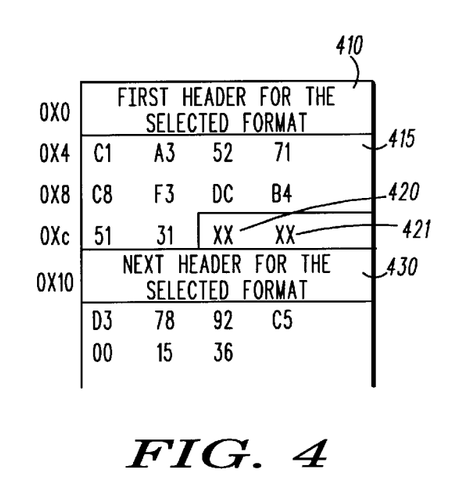
FIG. 4 illustrates the multimedia data streams stored in memory after packetizing in the required format.

FIG. 4 illustrates the multimedia data stream 125 stored in the main memory 140 after it is packetized in the selected required format. The packetizer 110 inserts a first header 410 needed for the selected transport standard format. Hexadecimal bytes 320–322 (illustrated as 00 00 80) are an example of a packet boundary code detected by step 220 in the flow chart of FIG. 2. The packetizer 110 the present invention replaces the packet boundary code with the first header 410 for the selected transport standard format. This header and the remaining hexadecimal bytes 323–326 and so forth are aligned in memory such that easy transfer by the CPU of the data over a packet system is easily performed—such as the word-aligned width of the example in FIG. 4. In this example, a word is 4 bytes wide, and is illustrated by 415, showing the word-alignment of the data 323–326. The word-alignment of the packet in memory allows for easy access by the CPU and better efficiency in transferring the data out to the network and is not required by any standard format. When the next packet boundary code of hexadecimal bytes 330–332 (illustrated as 00 00 80) is detected in the packetizer 110 in step 220, this next packet boundary code is replaced with a next header 430. Don't care bits 420 and 421 (xx xx) are provided immediately before a next header 430 to fill out the required width of a last word. For example, the H.263 video RTP format of RFC 2429, a header of 2 bytes is required. Alternatively, the H.263 video RTP format of RFC 2019 might be selected, requiring a header of 4 or 8 bytes depending on the mode chosen. While the packet boundaries are the same code (00 00 80) in both packetization formats (RFC 2429 and RFC2019), the headers required for both are different.

Figure 5:
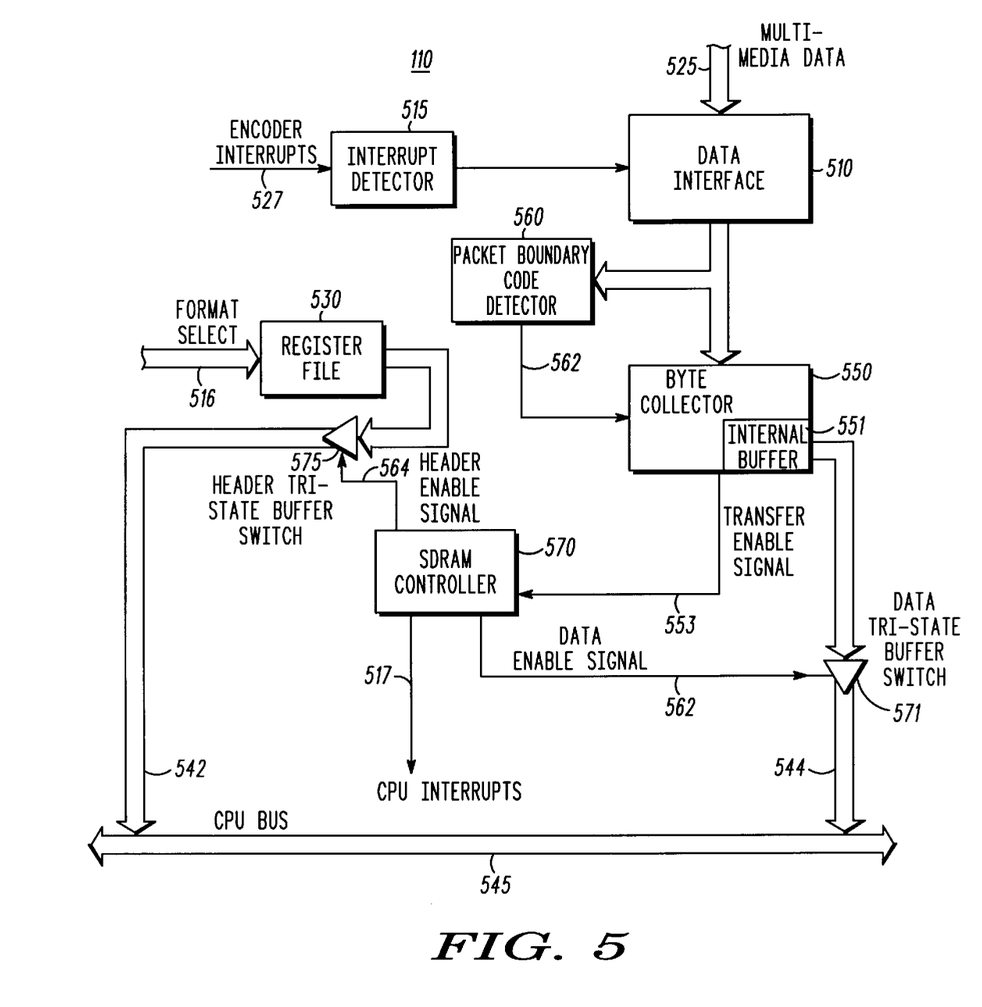
FIG. 5 illustrates a detailed preferred construction of the hardware packetizer.

FIG. 5 illustrates a preferred construction of the hardware packetizer 110. A data interface 510 receives multimedia data 525 from the encoder 120. An interrupt detector 515 gates the data interface 510 based on encoder interrupts 527 received from the encoder 120. A format select command 516 from the main processor 130 configures the packetizer to the desired standard format. The format select command 516 stores in a register file 530 one of a plurality of predetermined headers to provide for the header 410 or 430 corresponding to the selected one of a plurality of predetermined formats. The packetizer is capable of varying its packet sizes based on the format select command 516 to support different data rates. This allows the multimedia data 525 to have data rates that change on the fly, for example, during a video or audio session. As the multimedia data 525 is gated by the data interface 510, a byte collector 550 stores the multimedia data in an internal buffer 551. A packet boundary code detector 560 monitors the multimedia data 525 received at the data interface to identify a packet boundary code. When the packet boundary code is detected by the packet boundary code detector 560, a data enable signal 562 is sent to the byte collector 550. The byte collector 550 issues a transfer enable signal 553 to a SDRAM controller 570 and, according to the decision step 230 of the flow chart, either a packet boundary code is received per signal 562 or the internal buffer 551 is full. When the internal buffer 551 is full, the SDRAM controller 570 issues a data enable signal 562 to a data tri-state buffer switch 571 and enables dumping of the contents of the internal buffer 551 via line 544 to the CPU bus 545. On the other hand, when the packet boundary code detector 560 detects a packet boundary code, then the SDRAM controller 570 first issues a header enable signal 564 before issuing a data enable signal 562. The header enable signal 564 enables a header tri-state buffer switch 575 to dump the header stored in the register file 530 via line 542 to the CPU bus 545. Thereafter, the SDRAM controller 570 issues the data enable signal 562 to the data tri-state buffer switch 571 and dumps the contents of the internal buffer 551 via line 544 to the CPU bus 545 and also generates a CPU interrupt 517 for the main processor 130. The hardware packetizer 110 of the present invention can be formed in a programmable gate array such as a field programmable gate array FPGA.

Alternative system constructions of the present invention have a plurality of packetizers used simultaneously. When a plurality of packetizers is simultaneously used, a write bus arbitrator and an interrupt controller is needed for managing the main memory writes over the CPU bus 545 and the CPU interrupts delivered to the main processor 130. The write bus arbitrator will receive request signals from the SDRAM controllers 570 of each of the hardware packetizers 110 and issue write grant signals to the SDRAM controllers 570 when the CPU bus 545 is available. Likewise an interrupt controller will manage the delivery of CPU interrupts to the main processor 130 and identify to the main processor 130 which of the packetizers has issued a given CPU interrupt. The plurality of packetizers, the write bus arbitrator and the interrupt controller are preferably placed on the same programmable gate array. Further, although encoders are commercially available as separate component parts, the hardware packetizer could be formed on the same semiconductor substrate of the encoder and thus not be provided as a separate programmable gate array. The plurality of packetizers 110 of the first, second and third alternative system constructions is illustrated in FIGS. 6–8 as will be described below.

Figure 6:
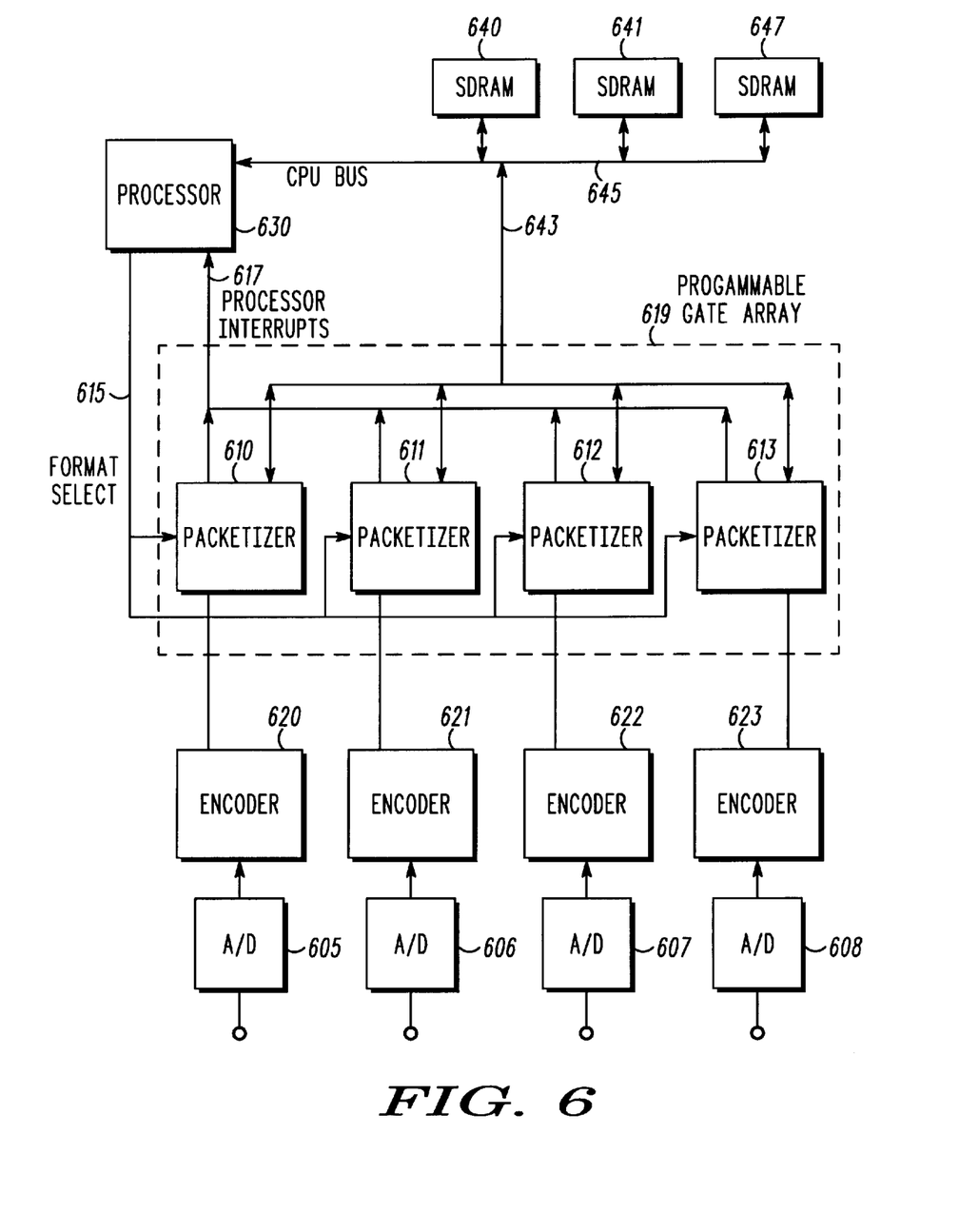
FIGS. 6–8 illustrate first, second and third alternative system constructions of the present invention.

FIG. 6 illustrates a first alternative system construction of the present invention having four multimedia data sources feeding analog to digital converters 605–608 and encoders 620–623. In a preferred construction according to the first alternative embodiment of FIG. 6, four video cameras provide multimedia data to the analog to digital converters 605–608. A processor 630 receives the multimedia data from the SDRAM 640 in a selected format as commanded by the processor or 630 to the packetizers 610–613 by a format select command 615. The packetizers 610–613 are preferably formed in a programmable gate array 619. The processor 630 can provide a plurality of the video signals in a selected format over a radio channel or over the internet, for example. A preferred application of this system would be in a day-care where four cameras monitor children and send the video images over a telephone line transport or a TCP/IP transport. By using the hardware packetizers 610–613 of the present invention on a selected format 615, an ordinary main processor 630, such as that of a conventional personal computer, can be used to couple the multimedia sources to a desired phone line or TCP/IP connection. The format types accommodated our virtually limitless and accordingly the packetizers will allow the processor to couple multimedia sources to radio telephone connections, dedicated lines, broadband coaxial cable or fiber optic paths or the like.

The plurality of packetizers 610–613 dump the buffer multimedia data to memory on line 643. Besides storage and the SDRAM 640, the multimedia data can be stored in a flash memory 641 or on a hard disk 647. The SDRAM 640, the flash memory 641 and the hard disk 647 couple over the CPU bus 645 to the processor 630. Processor interrupts 617 are generated by the packetizers 610–613 for the processor 630 when multimedia data is dumped to memory on line 643.

Figure 7:
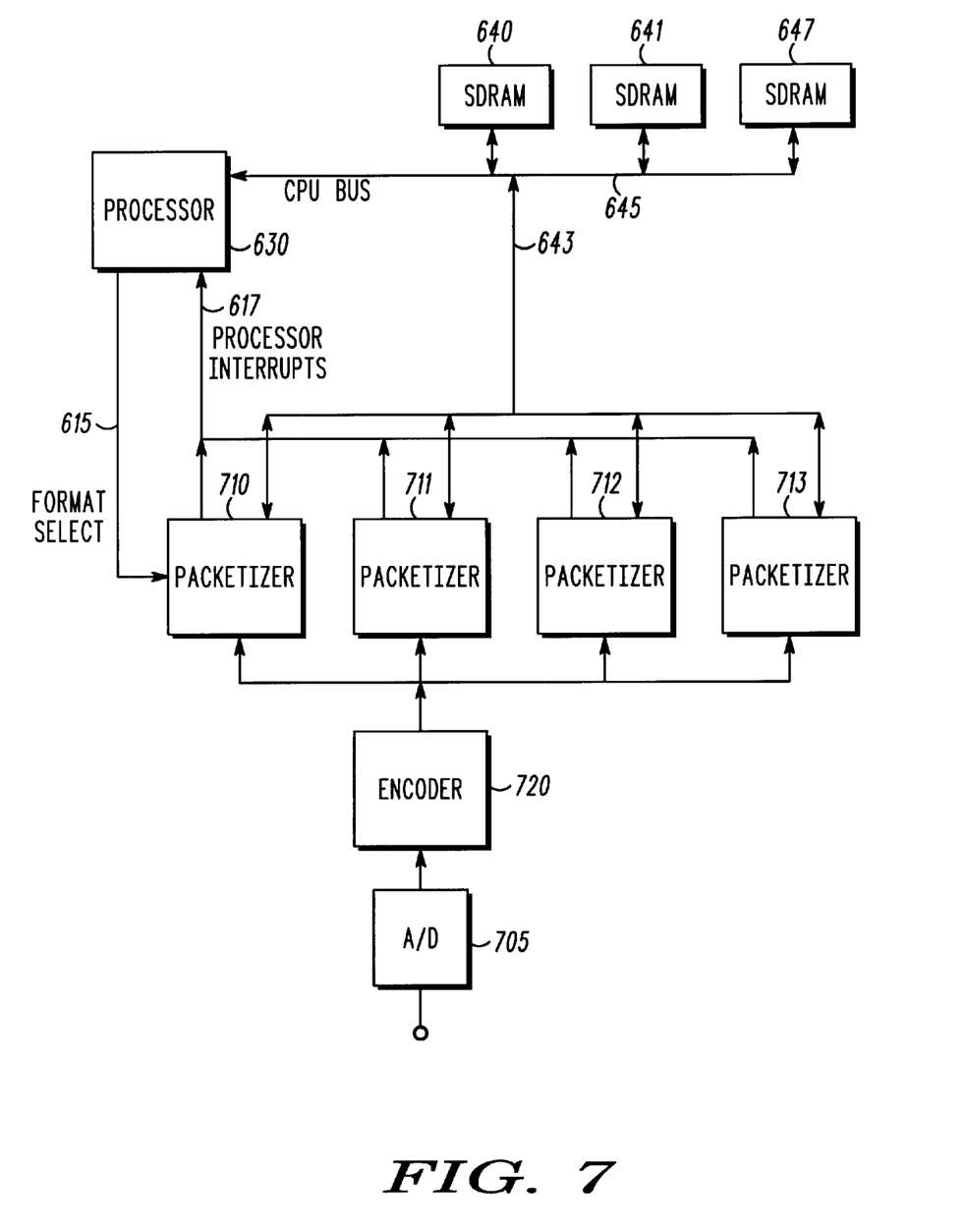
Figure 8:
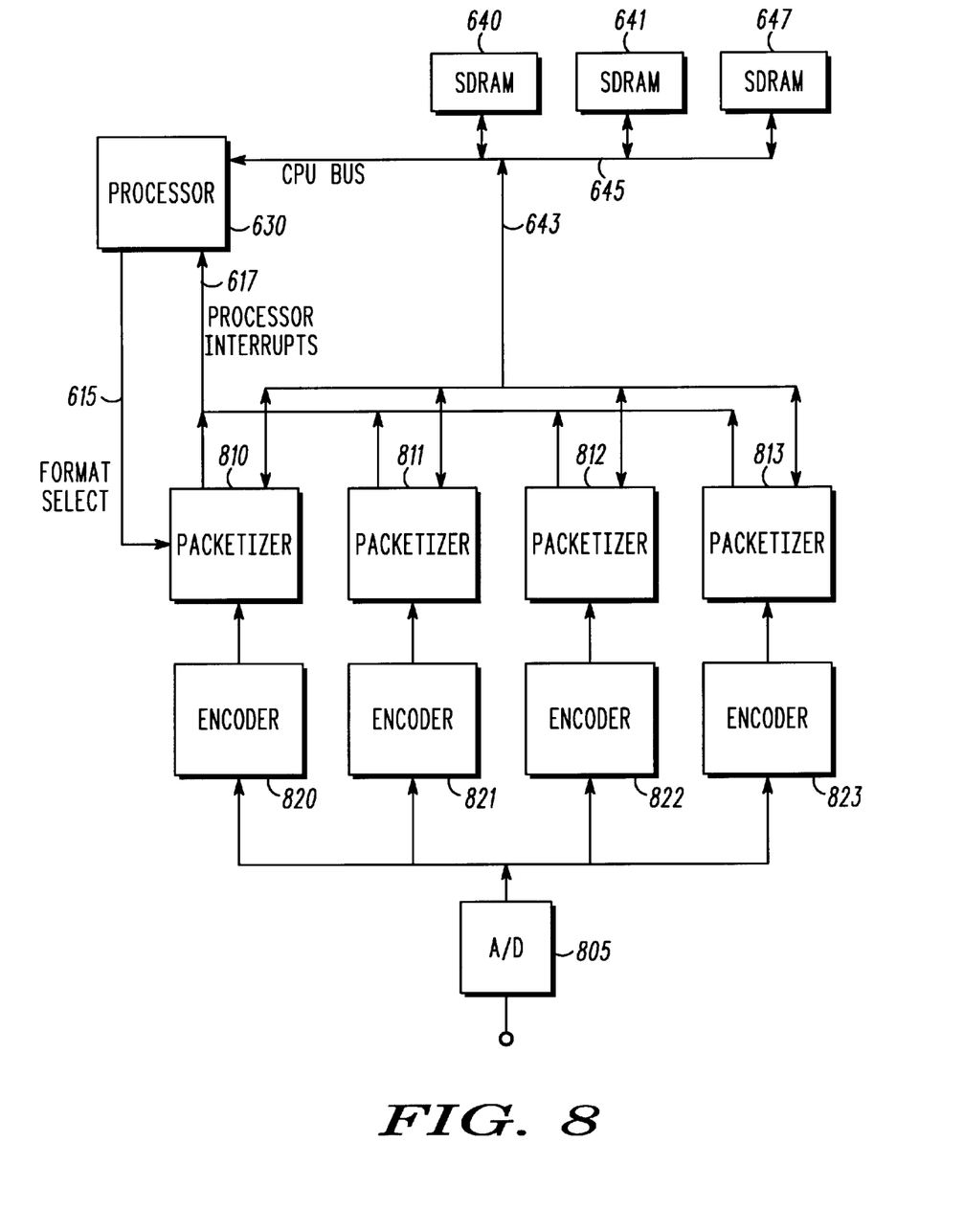

FIG. 7 illustrates a second alternative system construction of the present invention having a single multimedia data source such as a digital video camera feeding four packetizers 710–713 via a single analog to digital converter 705 and a single encoder 720. The single encoder 720 of the second alternative system construction of FIG. 7 provides one encoding format, yet multiple packetizers 710–713 can provide different formats for different transport. For example, the H.263 video format described above with respect to FIGS. 1 and 5 has different formats whereby different packetizers can provide, in a parallel real-time operation, packetized multimedia data for different selected transport formats. Such is useful, for example, when a public event such as a presidential inauguration is videoed but multiple formats are required by different press outlets and different consumers. Some digital video streams will be sent by high-resolution video while others will be sent over the internet and a TCP/IP connection. The present invention allows multiple real-time formatting to occur in a programmable efficient manner.

FIG. 8 illustrates a third alternative system construction of the present invention having a single multimedia data source such as a digital video camera feeding four encoders 820–823 and four packetizers 810–813 via one analog to digital converter 805. In this third alternative system construction, a single multimedia source can be monitored but encode multiple different ways by the multiple encoders 820–823. The multiple packetizers can be programmed to packetizers the output of the one encoder type according to a different formats for that encoder type. For example, encoder 823 encodes in the AMR audio format. As described above with respect to the embodiment of FIGS. 1 and 5, the AMR audio format has multiple format types which can be selected by the format select line for the packetizer to format. AMR is the adaptive multirate audio encoding scheme for third generation cellular radio standards.

Although the invention has been described and illustrated in the above description and drawings, it is understood that this description is by example only, and that numerous changes and modifications can be made by those skilled in the art without departing from the true spirit and scope of the invention. Although the above drawings depict only one main processor, multiple different types of processors can be supported by the hardware packetizer of the present invention. The present invention is not limited to portable electronic devices and radio infrastructure but can be applied to other devices such as Internet servers and routers and multimedia and audio video processing computer peripherals.

What is claimed is:

1. A hardware packetizer for formatting real-time raw input multimedia data according to a selected format, comprising:
   a byte collector having a buffer operatively connected to buffer the real-time raw input multimedia data;
   a packet boundary detector operatively connected to the byte collector to monitor the real-time raw input multimedia data and indicate when a packet boundary is received;
   a memory controller operatively connected to the byte collector to dump the contents of the buffer to a main memory and issue an interrupt to a main processor when the packet boundary detector detects that a packet boundary is received and to dump the contents of the buffer to the main processor when the buffer is full.

2. A hardware packetizer according to claim 1, further comprising a register file operatively connected to the memory controller for storing one of a plurality of predetermined headers to be inserted at the beginning of a packet dumped from the buffer to the main memory, wherein the one of a plurality of predetermined headers is stored based on an instruction commanding a selected format received from the main processor.

3. A hardware packetizer according to claim 2, wherein the byte collector is gated by packet interrupts received from an encoder.

4. A hardware packetizer according to claim 1, wherein the memory detector is operatively connected to the register file to vary sizes of packets of the data dumped to memory based on the instruction to support different data rates during a session.

5. A hardware packetizer according to claim 1, wherein the byte collector is gated by packet interrupts received from an encoder.

6. A hardware packetizer according to claim 1, wherein the selected format represents one of a plurality of transport standards.

7. A hardware packetizer according to claim 1, wherein the selected format includes MPEG.

8. A hardware packetizer according to claim 1, wherein the selected format includes AMR.

9. A hardware packetizer according to claim 1, wherein the hardware packetizer is implemented in a programmable gate array.

10. A hardware packetizer according to claim 1, wherein the memory controller dumps the buffer in word-alignment with a word size needed by the main processor to achieve better efficiency in transferring the data out to the network.

11. A hardware packetizer according to claim 10, wherein don't care bits are added to fill out a word at the end of a packet according to a selected format.

12. A hardware packetizer according to claim 1, further comprising at least another hardware packetizer, wherein the another hardware packetizer is coupled to the same source as the first hardware packetizer to provide for simultaneous packetizing of the same real-time raw input data according to at least two formats.

13. A hardware packetizer according to claim 1, further comprising at least another hardware packetizer, wherein the another hardware packetizer is coupled to a different, second source.

14. A system for formatting real-time raw input data according to a selected format for transport, comprising:
   an encoder for receiving the a real-time raw input data from a source;
   a main processor;
   a main memory operatively connected to the main processor by a CPU bus; and
   a packetizer operatively connected to the encoder to buffer the real-time raw input data and to monitor the real-time raw input data, operatively connected to the main memory to monitor when a packet boundary is received and store the buffered data in the main memory, and operatively connected to the main processor to issue an interrupt to the main processor when a packet boundary is received.

15. A system according to claim 14,
   wherein the main processor is operatively connected to the packetizer to issue an instruction commanding packetizing in a selected one of a plurality of predetermined formats; and
   wherein the packetizer is operatively connected to the main memory to store a header to be inserted at the beginning of a packet of the buffered data stored in the main memory, wherein the header corresponds to the selected one of a plurality of predetermined formats.

16. A system according to claim 15, wherein the packetizer varies sizes of packets of the data dumped to the memory based on the instruction from the main processor to support different data rates during a session.

17. A system according to claim 15, wherein the packetizer comprises a buffer; and wherein the packetizer is operatively connected to the main memory to dump the contents of the buffered data to the main processor when the buffer is full.

18. A system according to claim 15, wherein the encoder is operatively connected to the packetizer to provide encoder interrupts to the packetizer; and wherein the packetizer buffers the raw input data in response to the encoder interrupts.

19. A system according to claim 14, wherein the selected format represents one of a plurality of transport standards.

20. A system according to claim 14, wherein the selected format includes AMR.

21. A system according to claim 14, wherein the real-time raw input data comprises multimedia data.

22. A system according to claim 14, wherein the hardware packetizer is implemented in a programmable gate array.

23. A system according to claim 14, wherein the memory controller dumps the buffer in word-alignment with a word size needed by the main processor to achieve better efficiency in transferring the data out to the network.

24. A system according to claim 23, wherein don't care bits are added to fill out a word at the end of a packet according to a selected format.

25. A system according to claim 14, further comprising at least another hardware packetizer, wherein the another hardware packetizer is coupled to the same source as the first hardware packetizer to provide for simultaneous packetizing of the same real-time raw input data according to at least two formats.

26. A system according to claim 14, further comprising at least another hardware packetizer, wherein the another hardware packetizer is coupled to a different, second source of real-time raw input data.

* * * * *